US008536269B2

(12) United States Patent
Xie et al.

(10) Patent No.: US 8,536,269 B2
(45) Date of Patent: Sep. 17, 2013

(54) PEROXIDIC FLUOROPOLYETHER AND ITS USE IN EMULSION POLYMERIZATION OF FLUORIN-CONTAINING MONOMER

(75) Inventors: Xueduan Xie, Fushun County (CN); Jun Qu, Fushun County (CN); Rong Bai, Fushun County (CN); Jianxin Zhang, Fushun County (CN); Xucang Yang, Fushun County (CN); Bo Chen, Fushun County (CN); Jingang Zhang, Fushun County (CN); Ming Zhang, Fushun County (CN); Xianquan Hu, Fushun County (CN); Yu Cheng, Fushun County (CN)

(73) Assignee: Nova-Duct Technologies Pty Ltd, Port Melbourne, Victoria (AU)

( * ) Notice: Subject to any disclaimer, the term of this patent is extended or adjusted under 35 U.S.C. 154(b) by 201 days.

(21) Appl. No.: 12/996,887

(22) PCT Filed: Aug. 15, 2008
(Under 37 CFR 1.47)

(86) PCT No.: PCT/CN2008/001478
§ 371 (c)(1),
(2), (4) Date: Mar. 30, 2011

(87) PCT Pub. No.: WO2010/017665
PCT Pub. Date: Feb. 18, 2010

(65) Prior Publication Data
US 2011/0207880 A1 Aug. 25, 2011

(51) Int. Cl.
*C08L 27/16* (2006.01)

(52) U.S. Cl.
USPC ........... 524/758; 524/805; 562/582; 562/586; 562/587; 562/596; 562/605; 526/242; 526/247; 526/248; 526/255

(58) Field of Classification Search
USPC .............. 524/544; 526/214, 231, 232.3, 242, 526/247; 562/583, 586, 587, 596, 605; 568/560, 563, 567, 594, 677
See application file for complete search history.

(56) References Cited

U.S. PATENT DOCUMENTS

| 3,650,928 | A | * | 3/1972 | Sianesi et al. | ...................... 522/5 |
| 5,656,201 | A | * | 8/1997 | Visca et al. | ...................... 516/21 |
| 5,777,291 | A | | 7/1998 | Marchionni et al. | |
| 5,783,789 | A | | 7/1998 | Guarda et al. | |
| 6,429,258 | B1 | * | 8/2002 | Morgan et al. | ................ 524/805 |
| 7,365,229 | B2 | | 4/2008 | Marchionni et al. | |
| 2006/0205921 | A1 | | 9/2006 | Marchionni et al. | |
| 2010/0121106 | A1 | * | 5/2010 | De Patto et al. | .............. 562/849 |

OTHER PUBLICATIONS

Faucitano et al., "ESR of Intermediate Radicals in Thermolysis Mechanisms: Peroxidic Perfluoro Polyethers", J. Am. Chem. Soc. 1984, 106, 4172-4174.*

* cited by examiner

*Primary Examiner* — Nicole M Buie-Hatcher
(74) *Attorney, Agent, or Firm* — Greer, Burns & Crain, Ltd.

(57) ABSTRACT

The present invention provides peroxidic fluoropolyether and a fluorine-containing dispersion obtained from polymerization of fluorine-containing monomers in the presence of peroxidic fluoropolyether as a surfactant. The peroxidic fluoropolyether can be used as surfactant for producing aqueous dispersion of fluorine-containing monomer in place of PFOA or the salts thereof. Thus the amount of PFOA or the salts thereof is reduced and the natural environment is protected. In addition, applying peroxidic fluoropolyether as surfactant and combining it with adjuvants, such as initiator, can induce the reaction moderate and can be beneficial to the polymerization control, thus reducing the amount of initiator or shortening the reaction time.

8 Claims, No Drawings

PEROXIDIC FLUOROPOLYETHER AND ITS USE IN EMULSION POLYMERIZATION OF FLUORIN-CONTAINING MONOMER

TECHNICAL FIELD

This invention belongs to the field of polymer chemistry, in particular, relates to a type of peroxidic fluoropolyether, its use as a surfactant in the polymerization of fluorine-containing monomer, and a fluorine-containing dispersion obtained from such polymerization in the presence of the peroxidic fluoropolyether as a surfactant.

BACKGROUND ART

Emulsion polymerization is the most commonly used method for preparing a fluorine-containing dispersion. That is to say, water, initiator, surfactant, fluorine-containing monomer and necessary additives can be added to a pressure vessel and reacted at 0° C.~150° C. under a certain pressure to produce a fluorine-containing dispersion. In the prior art, PFOA (Pentadecafluorooctanoic Acid) or the salts thereof is often used as a surfactant.

In the recent studies, it is found that the residue of PFOA or the salts thereof in the product or the loss during the manufacturing process will eventually enter the biosphere. It is shown that PFOA or the salts thereof exist in the groundwater, in the surface water and in the sea as well as in the blood of all wild animals and human body. For the human being, PFOA or the salts thereof can be transfused to the infant through the umbilical cord and be accumulated in its body. Although no specific results show that it is harmful to human health, PFOA or the salts thereof is highly stable and is difficult to degrade in natural environment. Currently, it has not been demonstrated that it would decompose in natural environment and in organic body; however, animal experiments show that high doses of PFOA can cause cancers, embryo deformities and other diseases. Hence, reducing or eliminating the use or residue of such substance is of practical significance.

In the manufacturing process of the fluorine-containing aqueous dispersion, other substances are tried to replace PFOA or the salts thereof as surfactants. U.S. Pat. No. 3,271,341 of Dupont Company of America disclosed that the analogues of $F-(CF_2)_m-O-[CF(X)-CF_2-O]_n-CF(X)-COOA$ was used as surfactants in emulsion polymerization of fluorine-containing alkenes; Patent WO 2007,011,631 of 3M Company of US disclosed the use of $CF_3-O-(CF_2)_3-(O-CF(CF_3)-CF_2)_z-O-L-Y$ type polyether in emulsion polymerization; U.S. Pat. No. 6,878,772B2 of Solvay Company of Belgium disclosed bifunctional fluoropolyether was used as a surfactant.

This invention provides a peroxidic fluoropolyether carboxylic acid or its salts and use thereof as surfactants in emulsion polymerization of fluorine-containing monomer.

CONTENT OF THE INVENTION

The invention provides a peroxidic fluoropolyether carboxylic acid or its salts and use thereof as surfactants.

The invention further provides a dispersion of fluorine-containing polymer in which peroxidic fluoropolyether carboxylic acid is used as a surfactant.

There are a peroxy bond —O—O— and an ether bond on the main chain of peroxidic fluoropolyether. From the point of view of bond energy and bond length, C—F bond is very stable; after introducing suitable amount ether bonds, C—O—C chain is easy to rotate, curl and relax. The above-mentioned features of structure result in the excellent high temperature resistance and chemical stability of fluorine-containing polyether, which is suitable for use as surfactants. Due to the small bond energy and the long bond length of peroxide bond, it is unstable and decomposes easily in the reaction. Applying peroxidic fluoropolyether as the surfactant and coordinating it with additives, such as initiator, in the production of aqueous dispersion of fluorine-containing monomer can induce the reaction moderate, and be beneficial to the polymerization control, thus the amount of initiator is reduced or the reaction time is shortened.

Peroxidic fluoropolyether according to the invention has an average molecular weight of 300-5000 and has the formula as follows (see formula (I)):

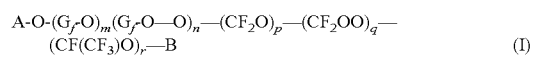

Wherein
$G_f$ is $-CF_2CF(CF_3)-$ or $-CF(CF_3)CF_2-$;
Terminal group A is $-CF_3$, $-COOM$ or $-CF_2COOM$; B is $-COOM$ or $-CF_2COOM$;
wherein, M is $-H$, $-NH_4$ or alkali metal elements;
m, n, p, q and r meet the following conditions:
(1) m, n, p, q, r are integers not less than zero;
(2) $n+q \geq 1$;
(3) $n+q \leq m+p+r$;
(4) $m \geq n+p+q+r$
(5) meeting the requirements of molecular weight range
Acid Value: 20-120 mgNaOH/g;
Peroxide Value: 0.5%~10.0% (wt).

Peroxidic fluoropolyether carboxylic acid or the salts thereof according to the invention are prepared referring to the patent GB 1,104,482, i.e. hexafluoropropylene (HFP) is used as the main raw material and reacts at low temperature and under the ultraviolet light. The resulting reactants were hydrolyzed, then the organic layer is taken to fractionate at negative pressure, in order to intercept fractions in the different boiling range (between 30° C.-180° C.) and obtain the peroxidic fluoropolyether with a certain range of Acid Value and/or Peroxide Value. The composition units and structure of resulting substance are identified by $^{19}FNMR$ (nuclear magnetic resonance). The Peroxide Value of resulting substance is determined by iodometric method.

The typical examples of the peroxidic fluoropolyether include, but are not limited to:

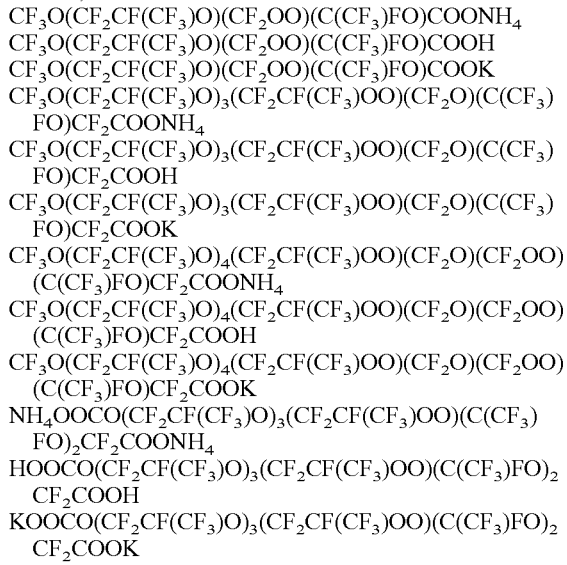

CF$_3$O(CF$_2$CF(CF$_3$)O)(CF$_2$CF(CF$_3$)OO)(C(CF$_3$)FO)COONH$_4$
CF$_3$O(CF$_2$CF(CF$_3$)O)(CF$_2$CF(CF$_3$)OO)(C(CF$_3$)FO)COOH
CF$_3$O(CF$_2$CF(CF$_3$)O)(CF$_2$CF(CF$_3$)OO)(C(CF$_3$)FO)COOK

According to the invention, peroxidic fluoropolyether carboxylic acid or the salts thereof with an average molecular weight of 300-5000, represented by formula (I) is used as a surfactant in aqueous polymerization of fluorine-containing monomer. The said surfactant is selected from the group consisting of the compounds represented by formula (I).

In general, aqueous polymerization of fluorine-containing monomers comprises the following steps:
(1) Reaction medium (water or other solvent) is added to a reaction vessel, N$_2$ or reaction gas is added to replace and remove oxygen in the reaction vessel, and generally the oxygen content is controlled as $\leq$20 ppm;
(2) Peroxidic fluoropolyether is added as a surfactant, then fluorine-containing monomer is added, and the pressure of the reaction system is controlled at 0.5 MPa~12 MPa;
(3) Additives and initiator is added to the reaction system, fluorine-containing monomer polymer dispersion is obtained after the polymerization of fluorine-containing monomer, wherein, the reaction temperature is in the range of 10° C.-150° C., the reaction time is generally in the range of 0.5 h~50 h.

The said additives are pH regulators, chain transfer agents, etc. known to the public. The said initiators are organic peroxides, inorganic peroxides or the analogues of redox substances known to the public.

The amount of the surfactant, peroxidic fluoropolyether carboxylic acid and the salts thereof according to the invention, is identical to those the common used surfactants, such as ammonium perfluoroocatanate. In general, the amount of surfactant is based on the amount of water used in the polymerization and is 0.005%~10 wt %, preferably is 0.05%~4 wt %, more preferably is 0.05 wt %~0.4 wt %.

Peroxidic fluoropolyether carboxylic acid and the salts thereof, the surfactant according to the invention, exists in the reaction vessel during the process of polymerization. The introduction mode of the surfactant is not particularly specified. The surfactant can be added before polymerization; alternatively, some of surfactant is firstly added before the starting of polymerization, and the remaining is added after the starting of polymerization. The said surfactant can be added to the reaction vessel alone, or be added to the reaction vessel together with other additives.

The polymerizable fluorinated monomer according to the invention is not particularly specified and comprises following types:
1. Perfluoro-olefins, such as tetrafluoroethylene (TFE), hexafluoropropylene (HFP), etc.;
2. Halogen-containing olefins, such as vinylidene fluoride (VDF), chlorotrifluoroethylene (CTFE), bromine- or iodine-containing olefins, and etc.;
3. Fluorine-containing olefin ethers, such as perfluoromethyl vinyl ether (PPME), etc.
4. Fluorine-containing heterocyclic double bond substances, perfluoro-2,2-dimethyl-1,3-dioxole (PDD), etc.;
5. Fluorine-free olefins or double bond substances that can copolymerize with fluorine-containing olefins, such as ethylene, propylene, etc.

Fluorine-containing olefins can polymerize alone to form a homopolymer dispersion, and can also polymerize with one or more other fluorine-containing monomer or other fluorine-free monomer to form a copolymer. The fluorine-free monomer that can copolymerize with the fluorine-containing monomer generally comprises ethylene and propylene.

Examples of the homopolymer usually refer to polytetrafluoroethylene (PTFE), polyvinylidene fluoride (PVDF), polychlorotrifluoroethylene (PCTFE); furthermore, those can be classified as homopolymer usually mean polymer in which a small amount of polymerizable monomers are added (generally not more than 3 wt %); and the added polymerizable monomers cannot change the basic properties of pure homopolymers. Examples of copolymers typically include the copolymers of vinylidene fluoride (VDF) and/or tetrafluoroethylene (TFE) and/or hexafluoropropylene (HFP); as indicated above, comonomers are not limited to those set forth herein.

The invention further provides a fluorine-containing polymer dispersion that is obtained from polymerization of at least a fluorinated monomer. Peroxidic fluoropolyether carboxylic acid or the salts thereof are used as a surfactant in such polymerization.

Fluorine-containing polymer dispersion according to the method of the invention contains at least 15 wt % solid (based on the total weight of dispersion); the average diameter of particles in the said dispersion is not more than 300 nm; based on the weight of water in the dispersion, the concentration of the surfactant is not more than 10 wt % and not less than 0.005 wt %, preferably is 0.05 wt %~4 wt %, more preferably is 0.05 wt %~0.4 wt %. The dispersion in polymerization of fluorine-containing monomer according to the invention generally comprises the following types:
1. Perfluoro-olefins, such as tetrafluoroethylene (TFE), hexafluoropropylene (HFP), etc.
2. Halogen-containing olefins, such as vinylidene fluoride (VDF), chlorotrifluorethylene (CTFE), bromine- or iodine-containing olefins, and etc.;
3. Fluorine-containing olefin ethers, such as perfluoromethyl vinyl ether (PPME), etc.
4. Fluorine-containing heterocyclic double bond substances, perfluoro-2,2-dimethyl-1,3-dioxole (PDD), etc.;
5. Fluorine-free olefins or double bond substances that can copolymerize with fluorine-containing olefins, such as ethylene, propylene, etc.

Fluorine-containing polymer dispersion prepared by the method of the invention is emulsion-like, plastic-like or rubber-like, after a known condensation technology; the solid components of the fluorine-containing polymer is plastic body or elastomer, which is amorphous or partially crystalline and is molded in a thermoplastic or thermosetting manner.

Applying peroxidic fluoropolyether according to the invention as the surfactant and coordinating it with additives, such as imitator, in the production of aqueous dispersion of fluorine-containing monomer can induce the reaction moderate, and be beneficial to the polymerization control. As a result, the reaction time is shortened or the amount of initiator is reduced.

MODE OF CARRYING OUT THE INVENTION

The present invention will be further illustrated by the following examples, but the scope of the invention is not limited thereto. The basic analytical and testing methods involved in the examples are shown as follows:
1. The average diameter of particles: light scattering;
2. Standard specific gravity: ASTM D-1457 method;
3. Solid component concentration: drying condition: 150□, 3 h;
4. Molecular weight distribution: gel chromatography;
5. Mooney viscosity: GB/T 1232 (China National Standard);
6. Density: GB/T 533 (China National Standard);
7. Peroxide value: iodometric method.

EXAMPLE 1

Preparation of Peroxidic Fluoropolyether

Referring to the method of preparation in the patent GB 1,104,482 (1968), an illumination device of ultraviolet (UV) lamp with the power of 125 W (wavelength is 250 nm-400 nm) was placed on a pressure-resisting steel reactor with the capacity of 2000 ml and a reflux device at −70° C., and the reactor and materials were precooled, then 2000 g of hexafluoropropylene (HFP) pre-cooled to −45° C. was added to the pre-cooled reactor. Mixed gas of oxygen ($O_2$, measured in standard condition) at the speed of 20 L/h and $C_2F_3Cl$ at the speed of 2.5 L/h were fed from the bottom of reactor. The reaction temperature was kept at −45° C. and the reaction period is 8 h. The reaction was terminated by ceasing the illumination of UV lamp. The refrigeration was stopped and HFP was recovered. The reaction products were collected from the bottom of reactor, placed into a vessel with a stirrer, and then hydrolyzed for 16 h by adding proper amount of 90° C. hot water. After stopping stirring, standing and delaminating, the oil phase was collected and 665 g of hydrolyzate was obtained. The hydrolyzate was fractionated at negative pressure, followed by intercepting fractions in the different boiling range (between 30° C.-180° C.). As a result, peroxidic fluoropolyether carboxyl acids with a certain range of Acid Value and/or Peroxide Value were obtained, which amounted to 604 g. Peroxide Value of each fraction was determined by iodometric method and the composition units and structure of resulting substance were identified by $^{19}$FNMR (NMR).

COMPARATIVE EXAMPLE 1

32 L of deionized water, 2000 g of paraffin and 50 g of surfactant PFOA were added to a 50 L of stainless steel pressure vessel with an agitator. Oxygen in the vessel was replaced with nitrogen, which was then replaced with tetrafluoroethylene (TFE) monomer, so that the oxygen content in the vessel was less than 20 ppm. TFE monomer was fed at 72° C. to make the internal pressure in the vessel up to 2.0 MPa. 500 g of ammonium persulfate (APS) aqueous solution with its concentration of 0.05% (wt) and 8 g of succinic acid were added to initiate reaction. The internal pressure in the vessel was decreasing during the process of reaction. TFE monomer was continuously added to maintain the internal pressure at 1.9~2.0 MPa, until the concentration of solid components in the dispersion reached about 30%. After stopping stirring and releasing the pressure, the reaction was terminated and aqueous dispersion of TFE homopolymer was obtained. The accumulative reaction time was 3.0 h. The subsequent unit processes including condensing, drying etc. were known technology and were not particularly specified.

According to the sample analysis, the solid content of the dispersion was 29.3% (wt); the average diameter of the primary particle was 230 nm; and the standard specific gravity (SSG) of the condensate was 2.184.

EXAMPLE 2

In the comparative example 1, only the type of surfactant was changed, 50 g of peroxidic fluoropolyether carboxylate [$CF_3O(CF_2CF(CF_3)O)(CF_2OO)(C(CF_3)FO)COONH_4$, 70.1 mgNaOH/g of Acid Value, 5% of Peroxide Value] fluorine-containing monomer polymer dispersion was obtained, wherein, the reaction time was 2.3 h; the solid content of the dispersion was 29.1% (wt); the average diameter of the primary particle was 240 nm; and the standard specific gravity (SSG) of the condensate was 2.182.

EXAMPLE 3

In the comparative example 1, only the type of surfactant was changed, and 50 g of peroxidic fluoropolyether carboxylate [$CF_3O(CF_2CF(CF_3)O)_3(CF_2CF(CF_3)OO)(CF_2O)(C(CF_3)FO)CF_2COONH_4$, 43 mgNaOH/g of Acid Value, 2.8% of Peroxide Value] was added. Fluorine-containing monomer polymer dispersion was obtained, wherein, the reaction time was 2.4 h; the solid content of the dispersion was 30.5% (wt); the average diameter of the primary particle was 235 nm; and the standard specific gravity (SSG) of the condensate was 2.180.

Comparing examples 2 and 3 with comparative example 1, it is shown that the time of polymerization of tetrafluoroethylene in examples 2 and 3 was shortened significantly by using peroxidic fluoropolyether as surfactants according to the invention.

COMPARATIVE EXAMPLE 2

30 L of deionized water was added to a 50 L of stainless steel pressure vessel with an agitator. Oxygen in the vessel was replaced with nitrogen, so that the oxygen content in the vessel was less than 20 ppm. 3 kg of initial mixing monomers including vinylidene fluoride (VDF) and hexafluoropropylene (HFP) were added, wherein, VDF:HFP=55:45 (mole ratio). After starting stirring and adjusting temperature, additional mixing monomers [vinylidene fluoride (VDF) and hexafluoropropylene (HFP), wherein, VDF:HFP=75:25 (mole ratio)] were fed into the vessel with internal temperature of 90° C., until the internal pressure in the vessel reached 2.3 MPa. 5 g of surfactant ammonium perfluoroocatanate, 10 g of potassium persulfate, 40 ml of PFOA, and 80 ml of diethyl malonate and 30 g of borax were added to initiate reaction. The internal pressure in the vessel was decreasing during the process of reaction. Then additional mixing monomers [vinylidene fluoride (VDF) and hexafluoropropylene (HFP), wherein, VDF:HFP=75:25 (mole ratio)] were continuously added to maintain the internal pressure at 2.2~2.3 MPa. The mixing monomers were added to make the concentration of solid components in the dispersion reach about 32%. After stopping stirring and releasing the pressure, the reaction was terminated and an aqueous dispersion of vinylidene fluoride (VDF) and hexafluoropropylene (HFP) copolymer were obtained. The accumulative reaction time was 4.0 h. The subsequent unit processes including condensating and drying were known technology and were not particularly specified.

According to the sample analysis, the solid content of the dispersion was 31.4% (wt); the average diameter of the primary particle was 190 nm; Mooney viscosity value of the condensate was $ML_{121}^{1+10}$=42; the density was 1.811 g/cm$^3$; and the value of molecular weight distribution was 2.40.

EXAMPLE 4

In the comparative example 2, only the type of surfactant and the amount of initiator were changed, and 5 g of peroxidic fluoropolyether carboxylate [$CF_3O(CF_2CF(CF_3)O)(CF_2OO)(C(CF_3)FO)COONH_4$, 70.1 mgNaOH/g of Acid Value, 5% of Peroxide Value] and 8 g of potassium persulfate were added. A fluorine-containing monomer polymer dispersion was obtained, wherein, the reaction time was 3.5 h; the solid content of the dispersion was 32.1% (wt); the average diameter of the primary particle was 185 nm; Mooney viscosity value of the condensate was $ML_{121}^{1+10}$=42; the density was 1.812 g/cm³; and the value of molecular weight distribution was 2.67.

EXAMPLE 5

In the comparative example 2, only the type of surfactant and the amount of initiator were changed and 5 g of peroxidic fluoropolyether carboxylate [$CF_3O(CF_2CF(CF_3)O)_3(CF_2CF(CF_3)OO)(CF_2O)(C(CF_3)FO)CF_2COONH_4$, 43 mgNaOH/g of Acid Value, 2.8% of Peroxide Value] and 8 g of potassium persulfate were added. A fluorine-containing monomer polymer dispersion was obtained, wherein, the reaction time was 3.5 h; the solid content of the dispersion was 31.6% (wt); the average diameter of the primary particle was 182 nm; Mooney viscosity value of the condensate was $ML_{121}^{1+10}$=43; the density was 1.816 g/cm³; and the value of molecular weight distribution was 2.56.

Comparing examples 4 and 5 with comparative example 2, it is shown that the amount of initiator was decreased by using peroxidic fluoropolyether as surfactants according to the invention.

INDUSTRIAL APPLICABILITY

The present invention provides peroxidic fluoropolyether, which can be used as a surfactant in the polymerization of fluorine-containing monomer in place of PFOA and the salts thereof. As a result, the damage to the natural environment caused by PFOA or the salts thereof can be reduced. In addition, applying peroxidic fluoropolyether as a surfactant in the polymerization can induce the reaction moderate, thus reducing the amount of initiator or shortening the reaction time.

The invention further provides a fluorine-containing dispersion obtained from polymerization of fluorine-containing monomers in the presence of peroxidic fluoropolyether as a surfactant. The solid component of the dispersion can be amorphous or partially crystalline, and can be thermoplastic or thermosetting plastomers or elastomer. After condensation, the fluorine-containing dispersions can be used to prepare the final products, such as emulsion, plastic, rubber, etc.

What is claimed is:

1. A peroxidic fluoropolyether with an average molecular weight of 300-5000, the acid value of 20-120 mg NaOH/g, the peroxide value of 0.5 wt %~10.0 wt %, and having the following formula:

$$A-O-(G_f-O)_m(G_f-O-O)_n-(CF_2O)_p-(CF_2OO)_q-(CF(CF_3)O)_r-B \quad (I)$$

wherein:
$G_f$ is —$CF_2CF(CF_3)$— or —$CF(CF_3)CF_2$—;
terminal group A is —$CF_3$, —COOM or —$CF_2$COOM;
group B is —COOM or —$CF_2$COOM; wherein, M is —H, —$NH_4$ or alkali metal elements;
m, n, p, q and r meet the following conditions:
(1) m, n, p, q, r are integers not less than zero;
(2) $n+q \geq 1$;
(3) $n+q \leq m+p+r$;
(4) $m \geq n+p+q+r$; and
(5) meeting the requirements of molecular weight range.

2. A dispersion obtained from polymerization of a fluorine-containing monomer, wherein, the peroxidic fluoropolyether of claim 1 is surfactant.

3. The dispersion as claimed in claim 2, wherein, the solid content of the dispersion is no less than 15 wt %, and the average diameter of the particles in the dispersion is not greater than 300 nm.

4. The dispersion as claimed in claim 2, wherein, the concentration of the surfactant is no more than 10 wt %, based on the weight of water in the dispersion.

5. The dispersion as claimed in claim 4, wherein, the amount of the surfactant added to the reaction is 0.05 wt %~4 wt %, based on the weight of water in the dispersion.

6. The dispersion as claimed in claim 4, wherein, the amount of the surfactant added to the reaction is 0.05 wt %~0.4 wt %, based on the weight of water in the dispersion.

7. The dispersion as claimed in claim 4, wherein, the fluorine-containing monomer is selected from the group consisting of perfluoro-olefins, fluorine-containing olefin ethers, fluorine-containing heterocyclic double bond substances of perfluoro-2,2-dimethyl-1,3-dioxole, fluorine-free olefins copolymerized with fluorine-containing olefins of ethylene and propylene, and mixtures thereof.

8. The dispersion as claimed in claim 4, wherein the fluorine-containing monomer is selected from the group consisting of tetrafluoro-ethylene, hexafluoro-propylene, vinylidene fluoride, chloro-trifluoro-ethylene☐, perfluoro-methyl-vinyl ether, and mixtures thereof.

* * * * *